UNTREATED FILM SAMPLE

ANODICALLY TREATED FILM SAMPLE

Inventor:
Raymond E. Skoda,
by John J. Kinane
His Attorney.

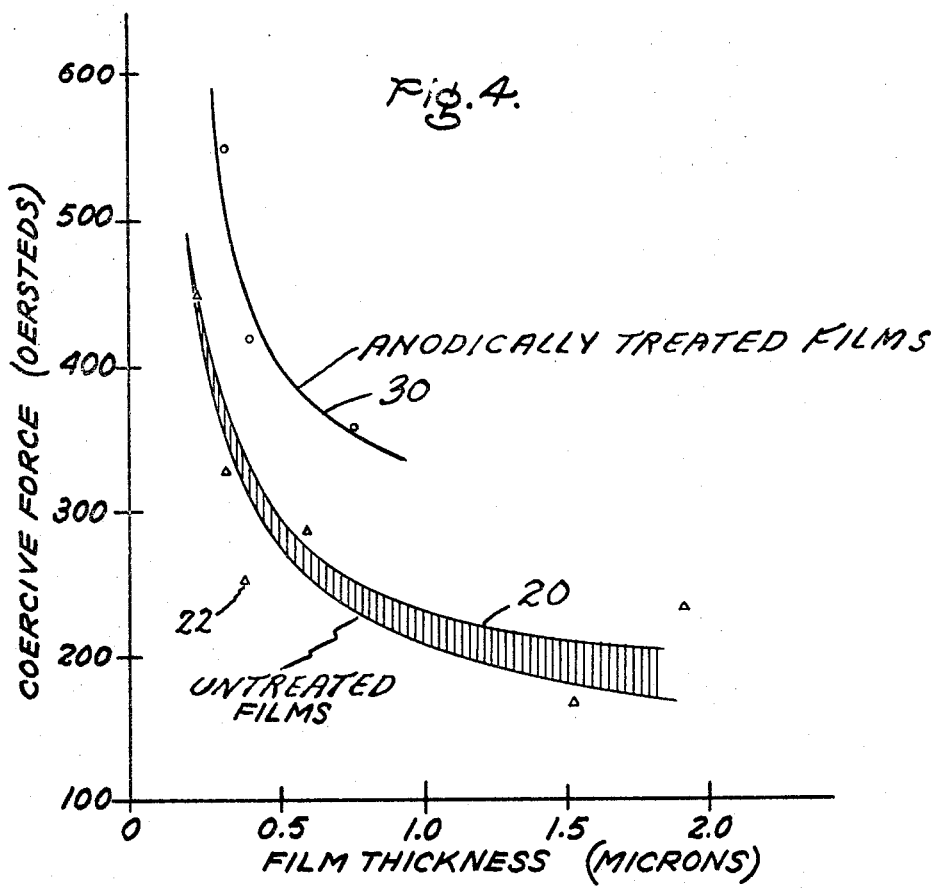
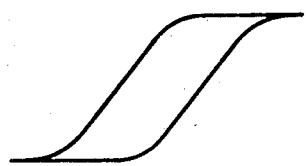

United States Patent Office 3,575,825
Patented Apr. 20, 1971

3,575,825
METHOD OF INCREASING THE COERCIVE FORCE OF COBALT-TUNGSTEN FILMS BY ANODIC TREATMENT
Raymond E. Skoda, Schenectady, N.Y., assignor to General Electric Company
Filed Jan. 12, 1968, Ser. No. 697,349
Int. Cl. C23f *17/00*
U.S. Cl. 204—35                                       5 Claims

ABSTRACT OF THE DISCLOSURE

The coercive force of a thin magnetic film of CoW is increased by approximately 100 oersteds for a given film thickness by positioning the magnetic film within the electrolytic solution employed to originally plate the film and anodically dissolving from 10-50% of the magnetic film into the solution.

---

This invention relates to a method of forming high coercive force magnetic films and in particular to a method of increasing the coercive force per unit film thickness by anodically dissolving a portion of the magnetic film in an electrolytic solution.

High coercive force magnetic films generally are desirable for most recording purposes and various techniques have been devised to fabricate diverse intermetallic alloy thin films having a high coercive force. It is generally well known, for example, that the coercive force of a magnetic film varies inversely with magnetic film thickness. Increasing the coercive force of magnetic films merely by decreasing the film thickness, however, generally is not effective in producing commercially usable high coercive force films because both the magnetization, which is directly dependent upon film thickness, and the mechanical strength of the film are adversely affected by a reduction in film thickness.

It is, therefore, an object of this invention to provide a novel method of increasing the coercive force per unit thickness of a magnetic thin film.

This and other objects of this invention generally are achieved by positioning at least a portion of the magnetic thtin film within a suitable electrolytic solution and anodically dissolving a portion of the magnetic thin film into the electrolytic solution thereby raising the coercive force of the film. When the magnetic thin film is formed by electrodeposition, the anodic treatment of the thin film preferably is accomplished in the same electrolytic solution employed to deposit the magnetic thin film and a power of 10-50% of the power employed to plate the magnetic film from the electrolytic solution is utilized to increase the coercive force of the magnetic film. For magnetic films formed by methods other than electrodeposition, a coercive force increase per unit thickness preferably is achieved by immersing the film in an electrolytic solution containing, dissolved therein, a metal electrolytically displaceable by at least one constituent of the magnetic film and anodically dissolving 10-50% of the magnetic film into the electrolytic solution.

Figure 1:
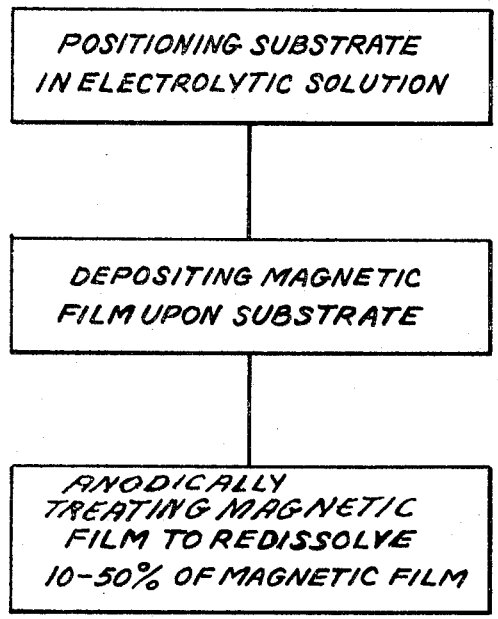
Figure 2:
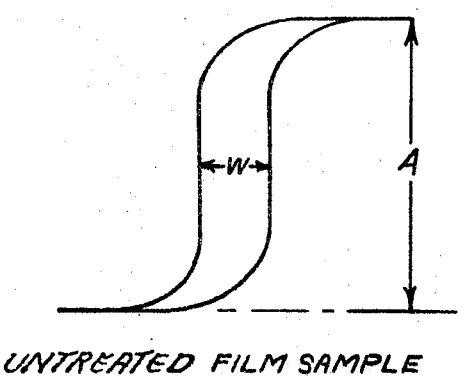
Figure 3:
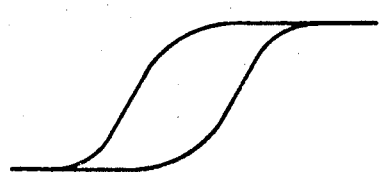

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a flow chart depicting in block diagram form the method of this invention, FIG. 2 is a portrayal of a hysteresis loop characteristic of an untreated electrodeposited cobalt-tungsten thin film, FIG. 3 is a portrayal of the hysteresis loop produced after an anodic treatment of the cobalt-tungsten thin film producing the hysteresis loop of FIG. 2, FIG. 4 is a graph depicting the variation of coercive force with film thickness for both anodically treated and untreated magnetic films, FIG. 5 is a portrayal of the hysteresis loop of a thin magnetic film formed by electrodeposition without anodic treatment, and FIG. 6 is a portrayal of the hysteresis loop formed by a hypothetical untreated cobalt-tungsten magnetic film equal in thickness to the magnetic film forming the hysteresis loop of FIG. 3.

The method of this invention for producing a magnetic film having a high coercive force per unit thickness is depicted in FIG. 1 and generally comprises positioning at least a portion of a substrate in an electrolytic solution containing the constituents of a magnetic film dissolved therein, depositing a magnetic film upon the submerged portion of the substrate by passing current in a first direction through the electrolytic solution and reversing current flow through the electrolytic solution to anodically treat the magnetic film within the electrolytic solution and redissolve a portion of the magnetic film into the electrolytic solution. An increase in the coercive force of the anodically treated magnetic film by approximately 100 oersteds relative to an untreated magnetic film of comparable thickness was obtained utilizing an anodic treatment power between 10-50% of the magnetic film deposition power.

The electrolytic solution utilized to originally form the magnetic film can vary dependent upon such factors as the constituents forming the magnetic film and the desired magnetic properties for the film. Of particular suitability for forming the magnetic film are electrolytes and techniques of the type described in copending application S.N. 673,790, filed Oct. 9, 1967 and assigned to the assignee of this invention. The foregoing application teaches the formation of magnetic recording films of tungsten-cobalt having a tungsten content between 1 and 40% by weight of the film by electrolytically depositing the film from a bath containing $CoSO_4 \cdot 7H_2O$, $CoCl_2 \cdot 6H_2O$, $Na_2WO_4 \cdot 2H_2O$ and $H_3BO_4$. For example, when a cobalt-tungsten magnetic film containing approximately 6% by weight tungsten is desired, an electrolytic solution of—

|  | G./l. |
|---|---|
| $CoCl_2 \cdot 6H_2O$ | 21 |
| $CoSO_4 \cdot 7H_2O$ | 250 |
| $Na_2WO_4 \cdot 2H_2O$ | 3.6 |
| Boric acid | 30 | having a pH and a temperature of 25° C. was found to be quite suitable. Either an active anode, e.g., cobalt, or a passive anode, e.g., platinum, can be employed in the electrodeposition of the magnetic film while a smooth nonmagnetic cathode such as gold-plated copper can serve as the substrate upon which the magnetic film is to be deposited. The magnetic film then is formed in a conventional manner by passing current through the electrolytic solution for a sufficient time to plate a magnetic film of desired thickness upon the cathode. Utilizing a cobalt anode and a plating current density of 100 ma. for 30 minutes through the electrolytic solution heretofore specifically described, a cobalt-tungsten magnetic film having a hysteresis loop depicted in FIG. 2 was deposited upon a gold-plated copper substrate.

The relative coercive force of the deposited magnetic film was determined from the hysteresis loop of FIG. 2 by a linear measurement in centimeters of one half the width W of the loop at zero magnetization. The linear measurement of the relative coercive force of the magnetic film then was converted to a reading in oersteds utilizing an instrument multiplying factor of 224 oersteds per centimeter deflection about a zero location which multiplying factor was obtained by a comparison of the maximum deflection of the 1000 turn pickup coils used in the hysteresis loop tracer against a coil containing a known number of turns carefully wound in a known diameter and having a maximum deflection corresponding to the magnetic field H calculated from the formula $$H = \frac{V}{2\pi f N A}$$

wherein:

H is the magnetic field wherein the coil is positioned
V is the induced voltage in the coil produced by the magnetic field
f is the frequency in cycles per second
N is the number of turns of the coil and
A is the cross sectional area of the wires forming the coil.

Alternating current through the coils was measured by an ammeter built into the power supply and current was set at an identical magnitude for all deflection readings. From a comparison of the maximum coercive force deflections produced for a given magnetic sample both by the known coil and by the hysteresis loop tracer coil utilized to subsequently measure the various test samples, the calibration constant of the utilized hysteresis loop tracer coil was determined to be 448 oersteds per volt. The sensitivity of the hysteresis loop tracer, however, was set at 2.0 cm./volt, or 224 oersteds/cm., during subsequent measurements to produce an enlarged view of the hysteresis loop. The measured total width W of the hysteresis loop depicted in FIG. 2 at zero magnetization was 1.6 cm. and the coercive force of the cobalt-tungsten magnetic film was calculated therefrom to be approximately 179 oersteds, e.g.

$$\frac{1.6}{2} \times 224$$

Similarly, the thickness of the electrodeposited cobalt-tungsten magnetic film was calculated from the hysteresis loop tracer of FIG. 2 utilizing the formula $$t = \frac{\phi}{B_s \cdot W}$$

wherein:

$\phi$ is a measurement of the magnetization of the film sample as determined from the hysteresis loop, e.g. one half the total amplitude, A, of the loop,
$B_s$ is the saturation remanence of the sample (assumed to be pure cobalt, e.g. 15,000 gauss, in all cases for purposes of calculations), and
W is the width of the sample.

Because each deposited magnetic film sample had a fixed width of one centimeter, the only variable in the formula for calculation of magnetic film thickness was the magnetization of the film as measured in centimeters from the hysteresis loop trace for each sample. Conversion of the measured magnetization from centimeters to maxwells was accomplished utilizing a magnetization deflection constant of 55 maxwells/cm. which constant was determined by a calibration of the hysteresis loop tracer utilizing both a 1 cm. by 0.25 cm. by 0.7 mil pure nickel sample having a known magnetization of 6050 gauss and a 1 cm. long, 1 mil diameter pure iron wire having a known magnetization of 21,500 gauss. Although the calculated thickness measurements of the magnetic film samples are slightly inaccurate because of the assumed saturation remanence for calculation purposes, the error in the calculated thickness of each magnetic film sample is approximately equal and tends to be compensating when the magnetic film samples are compared in thickness. For the magnetic film utilized to produce the hysteresis curve of FIG. 2, the magnetization, $\phi$, measured, 4.2 cm. and the thickness of the film was calculated therefrom to be 1.5 microns.

To increase the coercive force of a magnetic film in accordance with this invention, the magnetic film is immersed in an eletrolytic solution containing at least one constituent of the magnetic film dissolved therein and the magnetic film is anodically treated in the electrolytic solution to pass from 10–50% of the magnetic film into the electrolytic solution.

In specifically applying this principle to the magnetic film producing the hysteresis loop of FIG. 2, the film was immersed in a suitable electrolytic solution, e.g. the identical solution employed in plating the magnetic film, and the positive terminal of the electrolytic current supply was connected to the magnetic film to anodically treat the film within the electrolytic solution. A gold-plated copper cathode was connected to the negative terminal of the electrolytic current supply and 100 milliamperes was passed through the solution in a direction opposite the original plating direction for 10 minutes to dissolve a portion, e.g. approximately 33 percent, of the previously-deposited magnetic film (which acted as an active anode) into the electrolytic solution. Upon removal of the anodically treated magnetic film from the electrolytic solution, a black film was observed to have formed atop the anodically treated magnetic film and the black film was removed by wiping with a damp cloth. When the anodically treated magnetic film was positioned in the hysteresis loop tracer utilizing the identical instrument settings employed in tracing the unanodized magnetic film, the hysteresis loop depicted in FIG. 3 was produced. Upon a linear measurement of the magnetization and relative coercive force of the anodically treated magnetic film from the hysteresis loop, the coercive force of the anodically treated magnetic film was found to be 1.55 centimeters or 348 oersteds, e.g. an increase of 94 percent over the coercive force of the untreated magnetic film, and the thickness of the film was calculated to be 0.75 micron. All calculations were performed in the exact manner previously described with respect to FIG. 2.

The fact that the increase in coercive force of the magnetic film did not result solely from a reduction in the thickness of the film is demonstrated by the graphs of FIG. 4 wherein coercive force is plotted against film thickness for a variety of anodically treated and untreated films. All untreated magnetic film samples (depicted in lower curve 20) were produced in a manner identical to that heretofore described in the production of the magnetic film forming the hysteresis loop of FIG. 2 except for a variation in the deposition time to produce films of diverse thicknesses. Randomly-selected magnetic films of various thicknesses then were submerged as active anodes in the electrolytic solution and currents of various magnitudes were passed through the electrolytic solution for diverse periods of time to dissolve a portion of the selected magnetic films into the electrolytic solution. The variation in coercive force with film thickness for films which had been anodically treated in this manner is portrayed in upper curve 30 of FIG. 4. From a comparison of the anodically treated and untreated film curves of FIG. 4, it will be noted that an increase of almost 100 oersteds is produced in the coercive force of an anodically treated magnetic film relative to an untreated magnetic film of equal thickness. Preferably an anodic treatment power, e.g. anodizing current density multiplied by time, should be between 10–50 percent of the power employed in the formation of the film by electrodeposition to produce a maximum increase in coercive force without an erosion of an inordinate quantity of the magnetic film. When the magnetic film is formed by techniques other than electrodeposition, i.e. an anodic treatment preferably should dissolve from 10–50 percent of the film into the electrolytic solution.

The relative effect of film thickness and anodic treatment on coercive force can be determined by magnetic film sample 22 identified adjacent curve 20 of FIG. 4. Sample 22 was formed by electrodeposition using the identical electrolytic solution and parameters employed in the formation of the magnetic film producing the hysteresis loop of FIG. 2 but the deposition period was varied from 30 minutes to 10 minutes. After deposition of magnetic film sample 22 had been completed, the film sample was removed from the electrolytic solution, wiped dry and placed in the preset hysteresis loop tracer to form the hysteresis loop depicted in FIG. 5. The relative coercive force of the hysteresis loop at zero magnetization measured 1.15 cm., or 258 oersteds, as compared to the coercive force measurement of 348 oersteds for the anodically treated film producing the hysteresis loop of FIG. 3. The magnetization of magnetic film sample 22 as measured from the hysterisis loop was found to be approximately 1 centimeter, or one half the magnetization of the hysteresis loop of FIG. 3. From the measured magnetization, the thickness of magnetic film sample 22 was calculated (as previously described) to be approximately 0.37 micron as compared with the 0.75 micron thickness exhibited by the anodically treated film forming the hysteresis loop of FIG. 3. Thus, notwithstanding the fact that magnetic film sample 22 forming the hysteresis loop of FIG. 5 is thinner by a factor of one half relative to the anodically treated magnetic film forming the hysteresis loop of FIG. 3, the coercive force measurement of the thinner film, e.g. untreated magnetic film sample 22, was approximately only 74 percent of the measured coercive force of the thicker anodically treated film. The lower coercive force for the untreated thinner magnetic film indicates that some effect, e.g. possibly a preferential attack of the alloy film by the electrolytic solution, rather than a variation in film thickness enhances the coercive force of the magnetic film upon anodic treatment.

The hypothetical hysteresis loop which one would expect upon the electrodeposition of a magnetic film of cobalt-tungsten having a thickness equal to the magnetic film thickness of the anodically treated cobalt-tungsten forming the hysteresis loop of FIG. 3 is depicted in FIG. 6. This hypothetical hysteresis loop generally was obtained by a measurement of the coercive force along the lower curve 20 of FIG. 4 for a film equal in thickness to the anodically treated sample. No attempt was made to electrodeposit an untreated film of the calculated anodically treated magnetic film thickness because of the extremely high tolerances required in the electrodeposition parameters for a deposition to a highly precise thickness. Since the amplitude of the hysteresis loop is dependent upon film thickness, the hypothetical hysteresis loop is depicted as having an amplitude equal to the amplitude of the hysteresis loop of FIG. 3. The total width W of the hypothetical hysteresis loop however, is dependent upon the coercive force of the film and therefore is of a magnitude equal to that of an untreated film (2.2 cm. for a coercive force of 240 oersteds as determined from the lower curve of FIG. 4) having a thickness equal to 0.75 micron, e.g. the thickness of the anodically treated magnetic film forming the hysteresis loop of FIG. 3.

While several examples of this invention have been shown and described, it will be apparent to those skilled in the art that many changes and modifications may be made without departing from this invention in its broader aspects; and therefore the appended claims are intended to cover all such changes and modifications as fall within the true spirit and scope of this invention.

What I claim as new and desire to secure by Letters Patent of the United States is:

1. A method of producing cobalt-tungsten magnetic thin films comprising the steps of:
    positioning a portion of a substrate in an electrolytic solution containing the constituents of the cobalt-tungsten magnetic film dissolved therein;
    passing a current in a first direction through the electrolytic solution to electrodeposit a thin magnetic film of cobalt-tungsten, containing 1–40% by weight tungsten, upon the submerged portion of said substrate; and
    enhancing the coercivity of the magnetic thin film thus produced by reversing current flow through said electrolytic solution to anodically treat said magnetic thin film within said electrolytic solution and redissolve from 10 to 50% of said magnetic film into the electrolytic solution.

2. A method of producing a magnetic thin film having an enhanced coercive force according to claim 1 wherein said magnetic film contains approximately 6% by weight tungsten.

3. A method of producing magnetic thin film having an enhanced coercive force according to claim 2 wherein the electrical power employed to redissolve a portion of said magnetic thin film into the electrolytic solution is from 10–50 percent of the electrical power employed in electrodepositing said magnetic film upon the substrate.

4. A method of producing a cobalt-tungsten magnetic thin film comprising the steps of:
    positioning an electrically conductive, non-magnetic substrate within an electrolytic solution containing $CoCl_2 \cdot 6H_2O$, $CoSO_4 \cdot 7H_2O$, $NaWO_4 \cdot 2H_2O$ and $H_3BO_4$;
    passing current through said solution in a first direction to electrodeposit a cobalt-tungsten magnetic film, containing 1–40% by weight tungsten, upon said substrate; and
    enhancing the coercive force, for a given film thickness, of the magnetic film thus produced by reversing current flow through said electrolytic solution to redissolve from 10 to 50% of said magnetic thin film into said electrolytic solution.

5. A method of producing a cobalt-tungsten magnetic thin film having an enhanced coercive force for a given film thickness according to claim 4 wherein said electrolytic solution contains 21 g./l. $CoCl_2 \cdot 6H_2O$, 250 g./l. $CoSO_4 \cdot 7H_2O$, 3.6 g./l. $Na_2WO_4 \cdot 2H_2O$ and 30 g./l. $H_3BO_4$.

References Cited

UNITED STATES PATENTS

| | | | |
|---|---|---|---|
| 1,998,840 | 4/1935 | Legg et al. | 148—100 |
| 3,102,048 | 8/1963 | Gran et al. | 340—174X |
| 3,159,556 | 12/1964 | McLean et al. | 204—38X |
| 3,198,718 | 8/1965 | Quinn | 204—38X |
| 3,261,082 | 7/1966 | Maissel et al. | 29—155.7 |
| 3,135,671 | 6/1964 | Gade et al. | 204—34 |
| 3,287,238 | 11/1966 | Latawiec et al. | 204—140.5 |
| 3,516,881 | 6/1970 | Powell et al. | 148—31.55 |

JOHN H. MACK, Primary Examiner

W. I. SOLOMON, Assistant Examiner

U.S. Cl. X.R.

148—31.55; 204—141